(No Model.)
W. R. CLOSE.
FOG SIGNAL.
No. 261,135. Patented July 18, 1882.
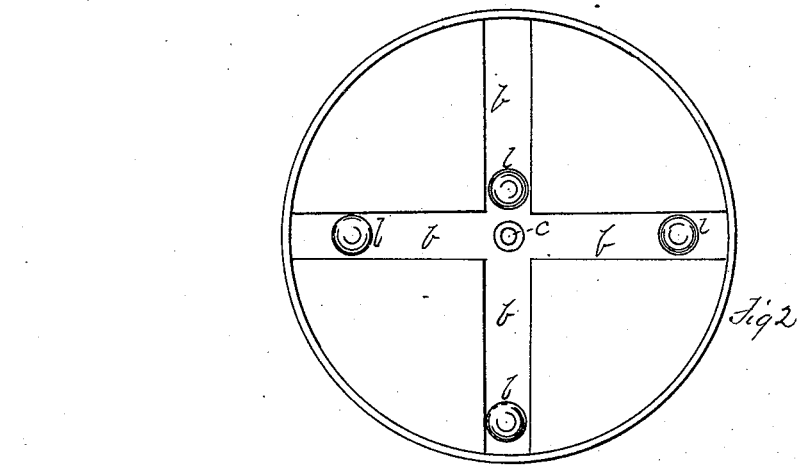
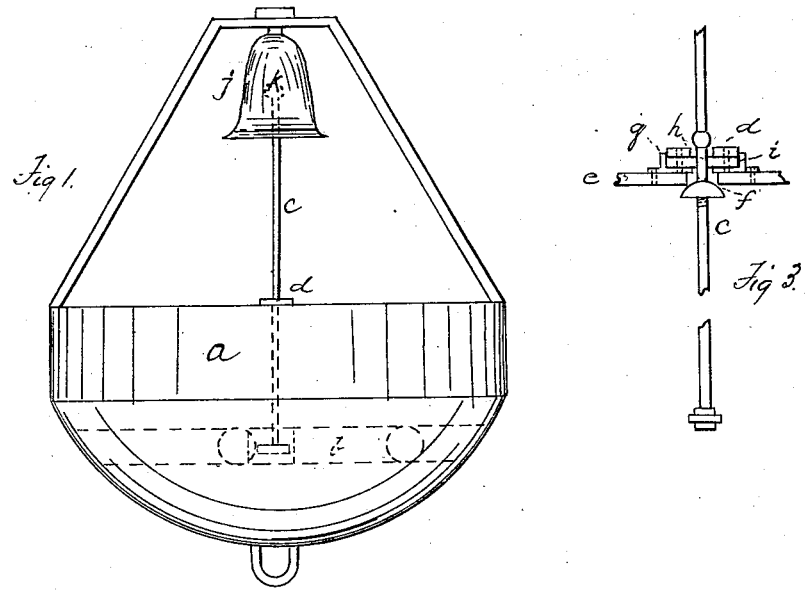
Witness
Otto F. Young
F. H. Clergue
Inventor
Walter R. Close
By Wm Franklin Seary
Atty.

UNITED STATES PATENT OFFICE.

WALTER R. CLOSE, OF BANGOR, MAINE, ASSIGNOR OF ONE-HALF TO FRANK H. CLERQUE, OF SAME PLACE.

FOG-SIGNAL.

SPECIFICATION forming part of Letters Patent No. 261,135, dated July 18, 1882.

Application filed January 13, 1882. (No model.)

*To all whom it may concern:*

Be it known that I, WALTER R. CLOSE, of Bangor, in the county of Penobscot and State of Maine, have invented certain new and useful Improvements in Fog-Signal Apparatus; and I do hereby declare that the following is a full, clear, and exact description of the invention, that will enable others skilled in the art to make and use the same, reference being had to the accompanying drawings, forming a part of this specification, in which—

Figure 1 shows an elevation; Fig. 2, plan of inside of float; Fig. 3, detail of joint.

Same letters show like parts.

My invention consists of an improved apparatus for operating fog-bells, and is applicable to that class of bells supported on a boat or float in which the bell is rung by the action of the waves.

My invention will be readily understood by reference to the accompanying drawings.

At $a$ is shown a float, preferably circular in form in horizontal cross-section, and having a bottom of such shape as to readily receive motion from the waves. This float is properly ballasted, and upon its inner bottom is provided with grooves or tracks $b\ b$, crossing each other at right angles. At their point of intersection is the end of a rod, $c$, extending upward through the top of the float, in which it is secured by a universal joint, $d$. This joint may of course be constructed in several well-known ways, keeping in view the necessity of excluding the water from the interior of the float. One form I illustrate in the detail, in which $e$ is the cover or top of the float, containing an opening, $f$, larger than the rod $c$. This opening is surrounded by a flanged ring, $g$, bolted to the top, its opening being also larger than the rod. The space between the flanges is filled by a rubber ring, $i$, fitting the rod closely and serving as packing. On this is a follower, $h$, secured by bolts, while the rod $c$ is provided with a projection, rounded in form and resting upon the follower, which supports it at the proper height. On the under side of the top the rod may be threaded, and a round nut, having its rounded side uppermost, screwed on to hold it in proper position without interfering with its motions. The upper end of the rod $c$ extends into a suspended ball, $j$, and is provided with a striker, $k$, of any desired shape.

In the grooves or tracks $b\ b$, before referred to, are metal balls or wheels $l\ l\ l\ l$, each rolling in its own division of the track from center to circumference of the float, or vice versa, as the float is moved by the waves. Now, the lower end of the rod $c$ extending into the cross-tracks at their intersection, the percussion of the balls as they strike it communicates motion to it and actuates the upper end, upon which is the striker $k$, ringing the bell. The lower end of the rod I prefer to surround with rubber to receive the blow of the balls and assist, by its elasticity, in returning them to the circumference of the float, and the ends of the tracks may be arranged in like manner. The balls are made of sufficient weight to operate the rod and striker effectually. The float may be anchored in any appropriate manner.

What I claim as my invention is—

The combination of the float $a$, having the bell $j$ secured thereto, the rod $c$, secured to said float by a joint, allowing motion in any direction on a substantially horizontal plane, the grooves or tracks $b$, and the balls or wheels $l\ l$, operating substantially as and for the purposes set forth.

In testimony that I claim the foregoing I have hereunto set my hand this 9th day of January, 1882.

WALTER R. CLOSE.

Witnesses:
F. H. CLERQUE,
WM. FRANKLIN SEAVEY.